United States Patent [19]

Gill

[11] Patent Number: 5,387,017
[45] Date of Patent: Feb. 7, 1995

[54] COUPLING FOR ATTACHMENT TO THE END OF A PIPE FOR SECUREMENT TO THE PIPE OR FOR JOINING PIPES TOGETHER

[76] Inventor: Ajit S. Gill, 4169 Bennion Rd., Salt Lake City, Utah 84119

[21] Appl. No.: 62,240

[22] Filed: May 14, 1993

[51] Int. Cl.[6] ............................................. F16L 21/06
[52] U.S. Cl. ................................. 285/322; 285/420; 285/314; 285/394; 251/149.8
[58] Field of Search ............... 285/420, 178, 112, 314, 285/394, 395, 306, 82, 322, 257; 251/149.8

[56] References Cited

U.S. PATENT DOCUMENTS

| | | | |
|---|---|---|---|
| 1,847,357 | 3/1932 | Murphy | 251/149.8 X |
| 2,362,454 | 11/1944 | Damsel | 285/366 X |
| 2,867,454 | 1/1959 | Pollia | 285/414 X |
| 3,039,797 | 6/1962 | Harper et al. | 285/395 |
| 3,495,515 | 12/1969 | Frishot | 285/420 X |
| 3,583,731 | 6/1971 | Jewell | 285/362 X |
| 3,695,638 | 10/1972 | Blakeley | 285/112 |
| 3,761,114 | 9/1973 | Blakeley | 285/111 |
| 4,448,448 | 5/1984 | Pollia | 285/112 |
| 4,471,979 | 9/1984 | Gibb et al. | 285/373 |
| 4,522,434 | 6/1985 | Webb | 285/112 |
| 4,557,509 | 12/1985 | Giebeler | 285/112 X |
| 4,561,678 | 12/1985 | Kunsman | 285/39 |
| 4,611,839 | 9/1986 | Rung et al. | 285/367 |
| 4,635,973 | 1/1987 | Sauer | 285/257 X |
| 4,639,020 | 1/1987 | Rung et al. | 285/367 |
| 4,872,712 | 10/1989 | Maier | 285/414 |
| 4,896,902 | 1/1990 | Weston | 285/93 |
| 5,046,763 | 9/1991 | Martucci et al. | 285/257 X |
| 5,050,913 | 9/1991 | Lenz | 285/332.1 X |

FOREIGN PATENT DOCUMENTS

| | | | |
|---|---|---|---|
| 736376 | 11/1932 | France | 285/394 |
| 794639 | 2/1936 | France | 285/257 |
| 287440 | 3/1928 | United Kingdom | 285/394 |
| 884539 | 12/1961 | United Kingdom | 285/112 |

Primary Examiner—Randolph A. Reese
Assistant Examiner—Heather Chun Shackelford
Attorney, Agent, or Firm—Mallinckrodt & Mallinckrodt

[57] ABSTRACT

A coupling for attachment to the end portion of a pipe having a circumferential shoulder in such end portion includes a coupling body which receives the end portion of the pipe therein and a set of jaw members which, after the end portion of the pipe is received in the coupling body, move to a closed position to engage the shoulder so that the coupling is locked onto the end of the pipe and the pipe cannot be pulled from the coupling because the jaw members acting against the shoulder prevent such movement. The coupling can be provided with sets of jaw members at each end to couple together two pipes with end portion shoulders or have jaw members at one end and threads, flanges, or other types of connectors at the other end. Valves or other fittings may be incorporated into the coupling between the ends of pipes being coupled.

23 Claims, 3 Drawing Sheets

COUPLING FOR ATTACHMENT TO THE END OF A PIPE FOR SECUREMENT TO THE PIPE OR FOR JOINING PIPES TOGETHER

BACKGROUND OF THE INVENTION

1. Field

The invention is in the field of attachments and couplings for the ends of pipe wherein the end portion of a pipe to be coupled to or attached to has a circumferential shoulder inwardly from the end of the pipe, usually formed by a circumferential groove in the pipe, which mates with the attachment or coupling to secure it to the pipe and prevent axial movement of the pipe with respect to the attachment or coupling.

2. State of the Art

There are many ways of attaching pipes to valves, connectors or other fittings and for coupling the ends of pipe together. It is common to provide screw threads on the ends of pipes with mating screw threads on valves, connector, or other fittings, or to connect threaded ends of pipe together with a threaded coupling. With plastic pipe, the various fittings may slide over the outside of the pipe and be glued into place.

It has also become common in some applications to provide grooves in the end portions of pipe to be connected together and to then connect the pipes with a clamp having flanges or keys which fit into the grooves to restrain axial movement of the pipes. Rather that fitting into a groove in the end portions of the pipes, these couplings can also fit against the side of a raised shoulder or bead at the end of a pipe. Such fittings are sold by Victaulic Company of America, Easton, Pennsylvania and are shown in U.S. Pat. Nos. 3,695,638; 3,761,114; 4,471,979; 4,561,678; 4,522,434; 4,611,839; 4,639,020; and 4,896,902. Generally these couplings extend between and engage the grooves on the ends of pipe to be joined end-to-end with a gasket held by the coupling around the abutting ends of the pipe to prevent leakage therefrom. The couplings are generally formed of two arcuate pieces, each adapted to extend circumferentially around half the pipe with the pieces joined and tightened or clamped around the pipe by bolts extending through outwardly extending bolt pads. With such attachment, the bolts securing the arcuate pieces of the coupling together around the pipe constrain the pressure of the fluid flowing in the pipe. Also, if the pieces of the coupling do not come completely together because of normal variations in the outside diameter of the pipes being joined, the sealing gasket may be left exposed or uncovered between the pieces which can result in extrusion of the gasket between the pieces and possible leakage. Placement of the coupling pieces over the pipe ends to join the pipes requires both pipe ends to be held in substantially exact position with the pipes aligned end-to-end and with grooves properly spaced to receive the keys or flanges of the coupling pieces as the coupling pieces are placed around the pipes and tightened therearound. This will usually require two workmen to accomplish. While such couplings usually extend between the grooves of pipes to be joined, in some instances, such as shown in U.S. Pat. No. 3,761,114, one of the pipes to be joined has the groove formed in the end portion thereof and the coupling engages the groove of that pipe end and is joined in more conventional manner, such as by a flange attachment, to the other pipe end, or to some type of pipe fitting. Still, however, the couplings are in two pieces joined by bolts, and require assembly in the field.

SUMMARY OF THE INVENTION

According to the invention, a coupling for attachment to the end of a pipe having a circumferential shoulder includes a coupling body with a receiving opening therein so that the coupling body closely receives and surrounds the end portion of a pipe to be coupled. A set of jaw members is mounted on the coupling body around the receiving opening for movement toward or away from a pipe received in the body. When the jaw members of the set are moved toward the pipe to a closed position, they engage the shoulder on the pipe to secure the coupling body to the pipe. When the jaw members of the set are moved away from the pipe to an open position, they disengage the shoulder so the coupling can be removed from the end portion of the pipe. The coupling may be used to secure a pipe to a valve or other fitting, or to join pipes together in end-to-end relationship. When joining pipes together, when both pipes to be joined have end portion shoulders, the coupling is provided with a second set of jaw members movable between an open and closed position for engaging or releasing the shoulder of a second pipe to be joined to a first pipe. The set of jaw members may be operable independently of the second set of jaw members in which case the coupling may be easily attached first to the end of one pipe and then to the other pipe. This can usually be done by a single workman. If both sets of jaw members are operable together, the pipes must be properly spaced with the coupling thereon before the jaw members of the two sets are operated simultaneously to move them to closed position. However, even in such cased since the ends of each of the pipes to be joined are received in the coupling body, and thus held in alignment by the coupling body, proper spacing of the pipes can usually be handled by a single workman.

The shoulder in the end portion of the pipe is generally formed by forming a groove in the end portion of the pipe so that the side of the groove closest the pipe end forms the shoulder. However, the shoulder may be formed by a raised bead in the end portion of the pipe wherein generally the side of the bead away from the end of the pipe forms the shoulder. The shoulder does not have to be continuous in order to operate with the attachment of the invention.

The jaw members of a set of jaw members will generally be mounted on an end of the coupling body around the receiving opening therein and in a preferred embodiment of the invention, are mounted for limited movement with respect to the coupling body around the central axis of the receiving opening. The jaw members include camming surfaces which mate with camming surfaces of the coupling body so that as the jaw members move around the receiving opening in one direction, they also move to closed position, and as they move around the receiving opening in the opposite direction, they move to open position. With such arrangement, the jaw members may be easily moved by a user between open and closed positions. The camming surfaces of the jaw members may take the form of bolts or pins extending through the jaw members into receiving slots in the coupling body which form the mating camming surfaces of the coupling body. Although not generally necessary, means may be provided for locking the jaw members in closed position.

In a preferred form of the invention, each jaw member of a set of jaw members is of substantially U-shape and includes a flat jaw piece forming one leg of the "U", a laterally spaced flange forming the other leg of the "U" and shorter than the jaw piece, and a transversely extending connector connecting the jaw piece and flange and forming the connecting portion of the "U". The flange is received and held by the coupling body and serves to hold the jaw member in place with respect to the coupling body. Where the coupling is to be used to join two pipes together in end-to-end relationship, the coupling body is cylindrical having flat opposite ends and having a cylindrical opening therethrough which closely receives the end portions of the two pipes to be joined, the ends of the two pipes being within the coupling body. The outer surface of the coupling body has a centrally located circumferential channel therearound which creates opposite end collars on the coupling body. A set of jaw member is mounted at each end of the coupling body. The jaw members of each set of jaw members are positioned around the coupling body opening, one set at one end of the coupling body and the other set at the other end so that when a flat jaw piece of a jaw member is against an end of the coupling body, the associated flange is against the side of the centrally located circumferential channel closest to the flat jaw piece. This positions the jaw members so that a coupling body end collar extends between the legs of the U-shaped jaw members, i.e. between the flat jaw piece and the jaw member flange, to prevent relative axial movement of the jaw members with respect to the coupling body. Each end of the coupling body has a plurality of slots therein, the number of such slots being at least equal to the number of jaw members in a set of jaw members, and preferably twice the number of jaw members in a set of jaw members, and at least one bolt, preferably two bolts, extends through each jaw piece with the end thereof extending into a slot for sliding movement along the slot. The bolts extending into the slots, in conjunction with the flanges, secure the jaw members to the coupling body, and the bolts extending into the slots limit the movement of the jaw members to movement allowed as the bolts slide in the slots. The slots are preferably curved with the curves such that the jaw pieces may be moved a limited distance around the body opening, the extent of movement being determined by the length of the slots, and as the movement along the slots takes place, the jaw pieces move between open and closed positions. Alternately, the slots could be straight, and positioned at an angle to similarly cause the inward and outward movement of the jaw pieces as the jaw pieces slide along the slots. When the pipes are received in the coupling body and the body positioned to extend between the shoulders of the respective pipes, the jaw members of each set are moved to closed position to secure the coupling to the pipe end portions. Gaskets are provided in the coupling body opening to prevent leakage of fluid flowing through the joined pipes.

THE DRAWINGS

The best mode presently contemplated for carrying out the invention is illustrated in the accompanying drawings, in which:

FIG. 1 is a longitudinal vertical section taken through a coupling of the invention used for joining two pipes in end-to-end relationship and showing the two joined pipes;

FIG. 2, a transverse vertical section of the coupling of FIG. 1 taken on the line 2—2 of FIG. 1;

FIG. 3, a transverse vertical section of the coupling of FIG. 1 taken on the line 3—3 of FIG. 1;

FIG. 4, an elevation of a set of jaw members arranged as they would be around an end of the coupling shown in FIGS. 1-3, but not showing other parts of the coupling, and with the gaps between the jaw members exaggerated;

FIG. 5, a longitudinal vertical section taken through a coupling of the invention showing an embodiment of the coupling included as part of a valve connected between the ends of two pipes; and FIG. 6, a longitudinal vertical section taken through a coupling of the invention showing an embodiment thereof to mate a pipe having a grooved end to a pipe with a threaded end.

DETAILED DESCRIPTION OF THE ILLUSTRATED EMBODIMENT

Figure 1:
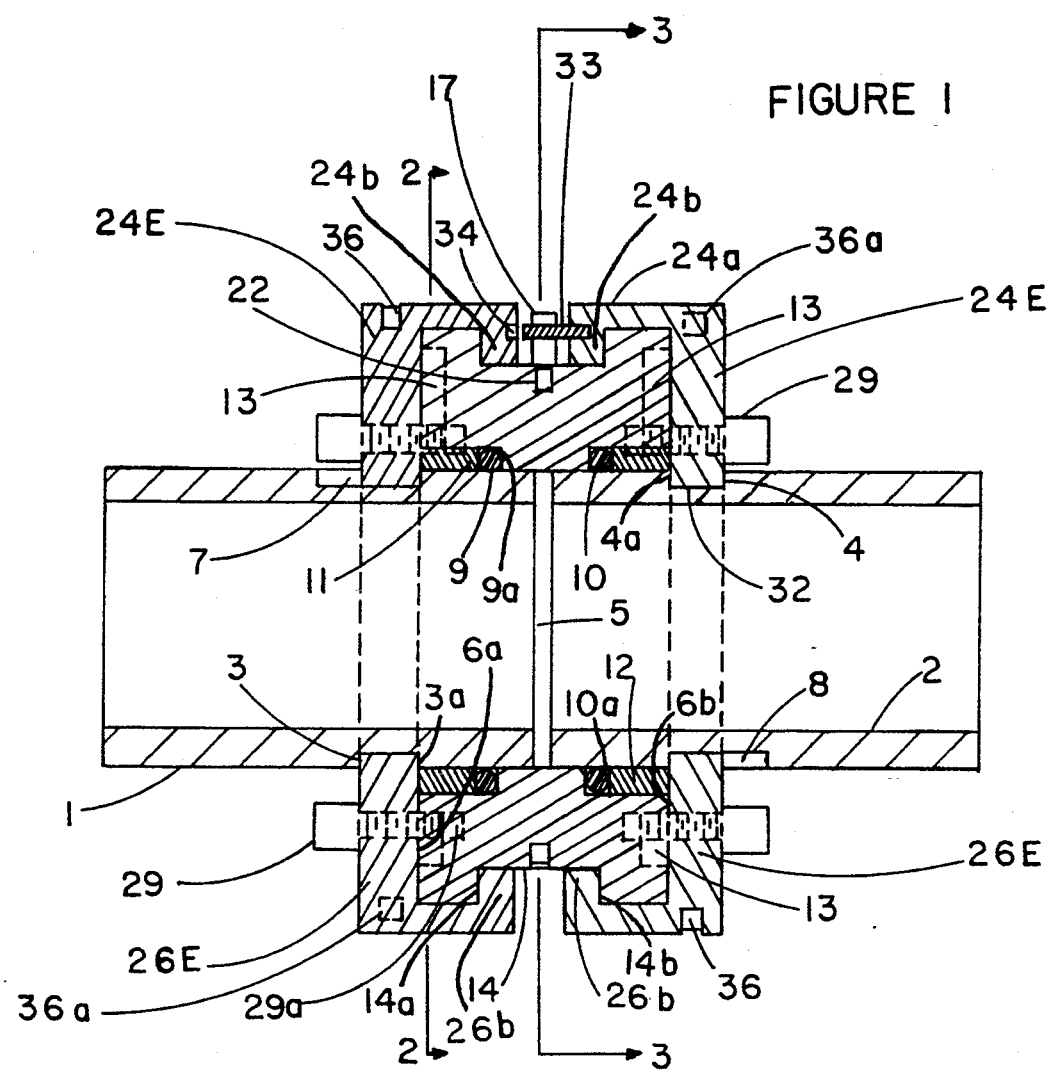
Figure 2:
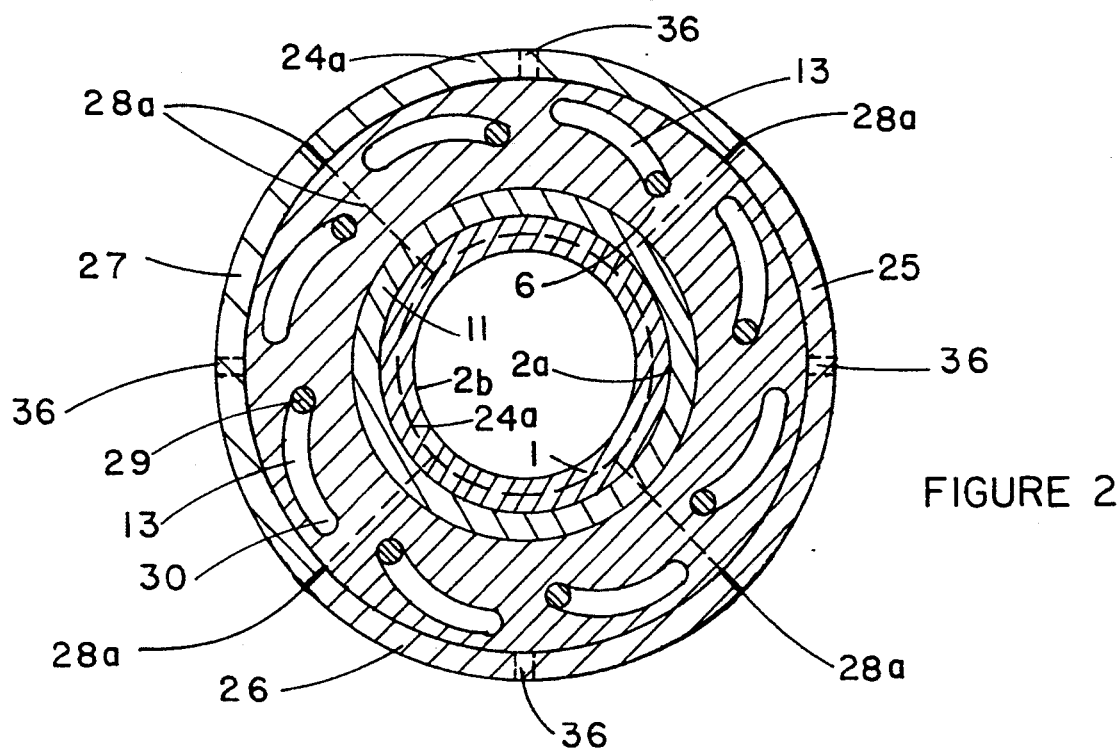
Figure 3:
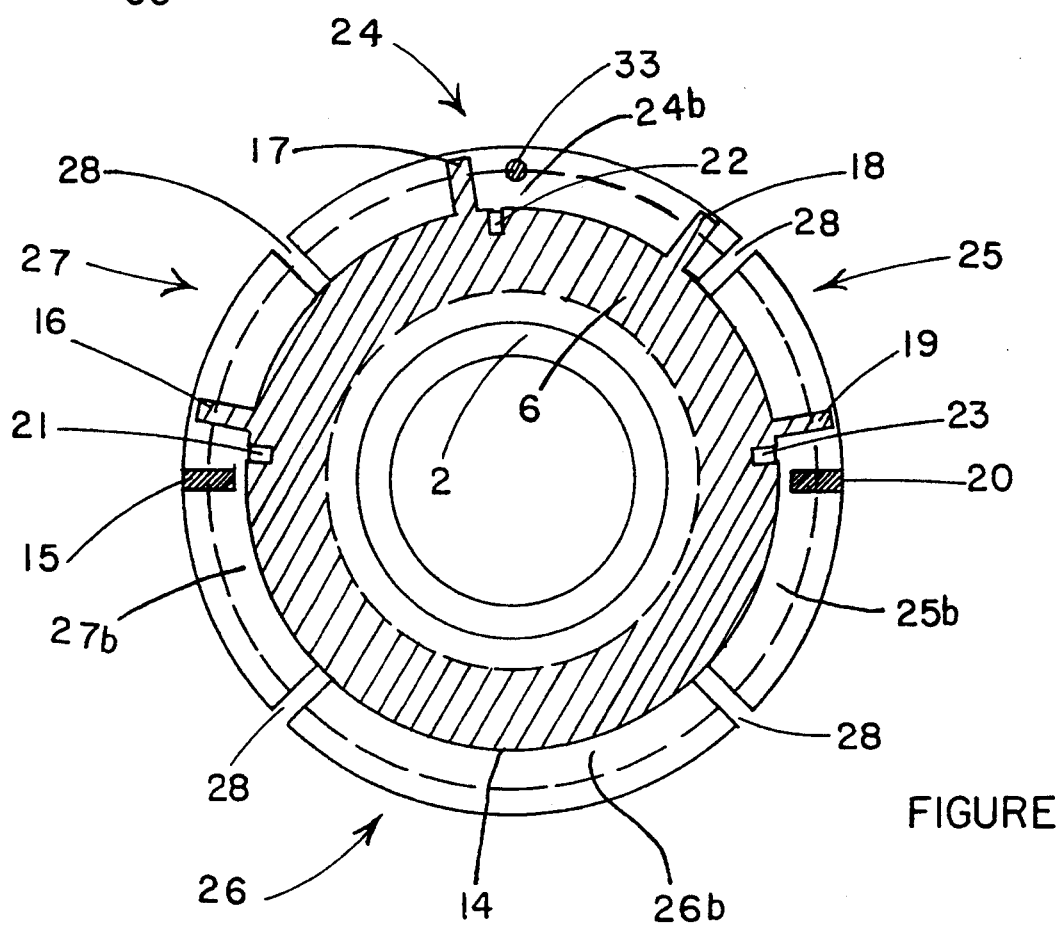

As shown in FIGS. 1 through 3, the invention may take the form of a coupling for joining the ends of two pipes together in end-to-end relationship. Pipes 1 and 2, FIG. 1, are provided with circumferential grooves 3 and 4, respectively, in the respective end portions of the pipes. The side of the groove 3 closest the end of pipe 1 forms a shoulder 3a, while the side of the groove 4 closest the end of pipe 2 forms a shoulder 4a. The coupling of the invention includes a cylindrical coupling body 6 of a length to extend between shoulder 3a in the end portion of pipe 1 and shoulder 4a in the end portion of pipe 2 when the ends of pipes 1 and 2 are received in cylindrical receiving opening 5 within coupling body 6. Coupling body 6 bridges the ends of the pipes 1 and 2 to be joined and is made of a material to withstand the maximum pressure of any fluid expected to flow through the pipes. The ends 6a and 6b of the coupling body 6 are substantially flat and are provided with a plurality of curved slots 13, FIG. 2. The slots may be formed in a solid coupling body, as shown, or may be formed in rings which are attached to and become part of the ends of the coupling body. A circumferential channel 14, FIGS. 1 and 3, extends into the outer surface of coupling body 6 intermediate its length, preferably centered along the length of coupling body 6, as shown in FIG. 1. This forms end collars at the opposite ends of the coupling body.

Figure 4:
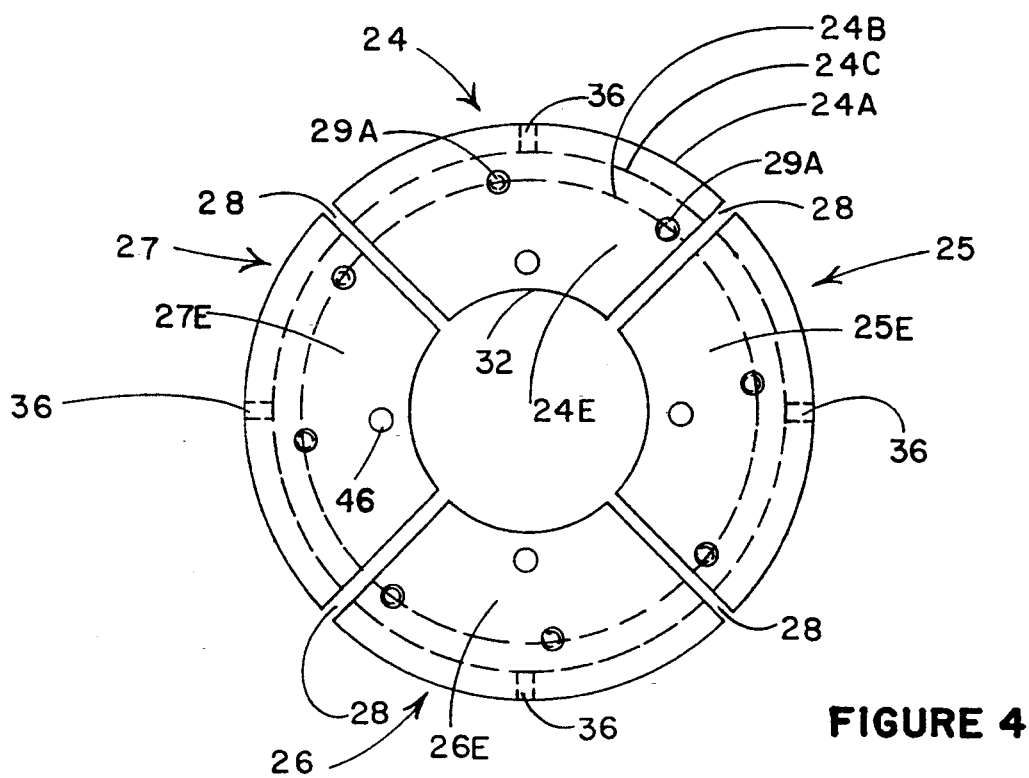

Two sets of substantially U-shaped jaw members, here each set is shown as including four jaw members 24, 25, 26, and 27, FIG. 4, are similarly arranged around opposite ends 6a and 6b of coupling body 6, FIG. 1. Each jaw member is made up of a flat jaw piece 24E, 25E, 26E, and 27E (24E and 26E are shown in FIG. 1) which is positioned against the end 6a or 6b of the coupling body, a laterally spaced, parallel flange 24b, 25b, 26b, and 27b, which is positioned against the wall of channel 14 toward the end of the coupling body against which the respective flat jaw piece is positioned, and a connector 24a, 25a, 26a, and 27a, which joins the jaw piece and the flange. The flat jaw piece, flange, and connector may be integrally formed, or may be made up of separate pieces secured together, such as by welding. In FIG. 4, 24A is the outside edge of the jaw member, 24C is the inside edge of the connector 24a, and 24B is the inside edge of the flange 24b. With a jaw piece against the end of the coupling body and its attached flange against the side of the channel, as shown in FIG. 1 for jaw members 24 and 26, the jaw member is positioned over a coupling body end collar and is securely held against axial movement relative to the coupling body. The only way the jaw member can be removed from the coupling body is by moving it radially outwardly until the flange no longer contacts the wall of the channel.

To limit and control the radial movement of the jaw members with respect to the coupling body, each jaw piece has a pair of bolts 29, FIG. 1, threaded through holes 29A, FIG. 4. The bolts are positioned so that the ends of the bolts extend through the jaw pieces and are received for sliding movement in slots 13 in each end of the coupling body. In this manner, movement of a jaw member is limited to movement of the bolts in the receiving slots. As shown in FIG. 2, the slots are elongate and have one end closer to the center of the coupling body than the other end. Thus, as the bolts slide in one direction along the slots, the bolts, and the jaw member attached to the bolts, move to a closed position closer to the center of the coupling body, i.e., the jaws will move toward a pipe received in the coupling body. As the bolts slide in the opposite direction along the slots, the bolts, and the jaw members attached to the bolts, move to an open position farther from the center of the coupling body, i.e., the jaws will move away from a pipe received in the coupling body. In effect, the slots form a camming surface on the coupling body upon which the bolts, which form mating camming surfaces on the jaw members, will slide. In moving or sliding along the slots, the jaw members will move in an arcuate manner around the receiving opening 5 in the coupling body and any pipe received therein. With the arrangement of slots as shown in FIG. 2, as the jaw members as shown in FIG. 4 are moved in a clockwise direction, the jaw members move radially inwardly to a closed position wherein the jaw members extend into the groove in a pipe received in the coupling to attach the coupling to the pipe. The bolts 29 are shown in FIG. 2 at the limit of clockwise travel in the slots, and the jaw pieces are shown in FIGS. 1 and 4 in the corresponding closed position. When the jaw members are moved in a counterclockwise direction, they move radially outwardly to the open position, wherein a pipe is free to move into or out of the receiving opening 5 in the coupling body. The gaps or spaces 28 between jaw members shown in FIG. 4 are exaggerated for purposes of illustrations, and when the jaw members are in closed condition, the gaps will normally be substantially closed. With small gaps, one of the jaw members can be moved along its slot and the other jaw member will be pushed along their slots by contact with the jaw member being moved.

To aid in moving the sets of jaw members, body 6 may be provided with radially projecting tabs 16, 17, 18, and 19, FIGS. 1 and 3, while axially projecting tabs 15 and 20, FIG. 3, extend from jaw member flanges 25b and 27b. A lever may be inserted between tabs 15 and 16 or 19 and 20 and used to move the jaw members relative to the coupling body. In addition to or rather than tabs 15 and 20 extending from jaw member flanges 25b and 27b, a bar 33, FIGS. 1 and 3, may be provided to extend from a receiving hole 34 in one of the flanges 24b. This is used similarly to tabs 15 and 20, i.e., a lever is placed between tab 17 projecting from coupling body 6 and bar 33, and using bar 33 as a fulcrum for the lever, the jaw members can be easily rotated. With receiving holes 34 located in flanges 24b at opposite sides of channel 14, as shown in FIG. 1, bar 33 can be coupled to one or the other of the opposite flanges, or can be inserted to hold both flanges at once so that both sets of jaw members can be rotated simultaneously, if desired.

In addition, or alternatively, coupling body 6 may be provided with blind holes 21, 22, and 23, FIGS. 1 and 3, in the bottom of channel 14, and the jaw members may each be provided with a blind hole 36 in the top thereof, FIGS. 1 and 2. By placing a rod in one of the holes 21, 22, or 23, and another rod in one of the holes 36, the rods can be pulled or pushed relative to one-another to rotate the respective sets of jaws relative to the coupling body.

While the construction of the coupling shown with channel 14 in the coupling body and a separate set of jaw members as described for each end of the coupling is currently preferred because each set of jaw members can be operated separately, the flanges of each of the jaw members could be eliminated and the connector extended to connect jaw pieces at opposite ends of the coupling body. For example, with reference to FIG. 1, flanges 24b could be eliminated and connectors 24a joined so that jaw pieces 24E on each side of coupling body 6 are connected by a single connector 24a. In such case, channel 14 in coupling body 6 is not necessary. With such construction, the jaws on both ends of the coupling body are formed of a single U-shaped jaw member and operate together. If such construction is used, elongate slots 7 and 8 may be provided in pipes 1 and 2, respectively, and a lever inserted into one or the other of the slots and used to move the adjacent bolt 29 to thereby easily move the jaw members between open and closed positions.

To prevent leakage of fluid from the joined pipes, the coupling body will include sealing means, such as O-ring seals 9 and 10 within receiving grooves in coupling body 6, which seal against the end portions of the joined pipes 1 and 2. As shown in FIG. 1, coupling body 6 has circumferential end grooves 9a and 10a which receive O-rings 9 and 10, respectively, which are held in place by end rings 11 and 12 inserted into end grooves 9a and 10a, respectively. While O-ring seals are shown, various other seals and other placements of the seals around the end portions of the pipes could be used.

While generally not necessary since once installed there are no rotational forces on the jaw members to move them from closed to open position, as a safety measure, or in locations where vibration is likely to occur, some type of locking means may be provided to lock the sets of jaw members in closed position. Such locking may be provided by deepening the ends of slots 13 at the ends of the slots representing closed position, i.e., the ends of the slots in which bolts 29 are shown in FIG. 2 extend further into coupling body 6 then the remaining portion of slots 13. This extended opening is shown as 29a in FIG. 1. Bolts 29 are made long enough so that during movement of the jaw members the bolts are only partially threaded through the jaw pieces. When the jaw pieces are in closed position, bolts 29 are rotated so they extend farther through the jaw pieces and extend into the deepened ends 29a of slots 13. This locks the set of jaw members in closed condition. It should be noted that it is only necessary to provide one slot 13 with deepened end 29a and one longer bolt 29 in that particular slot. Locking a single jaw member will lock all jaw members of that set.

Figure 6:
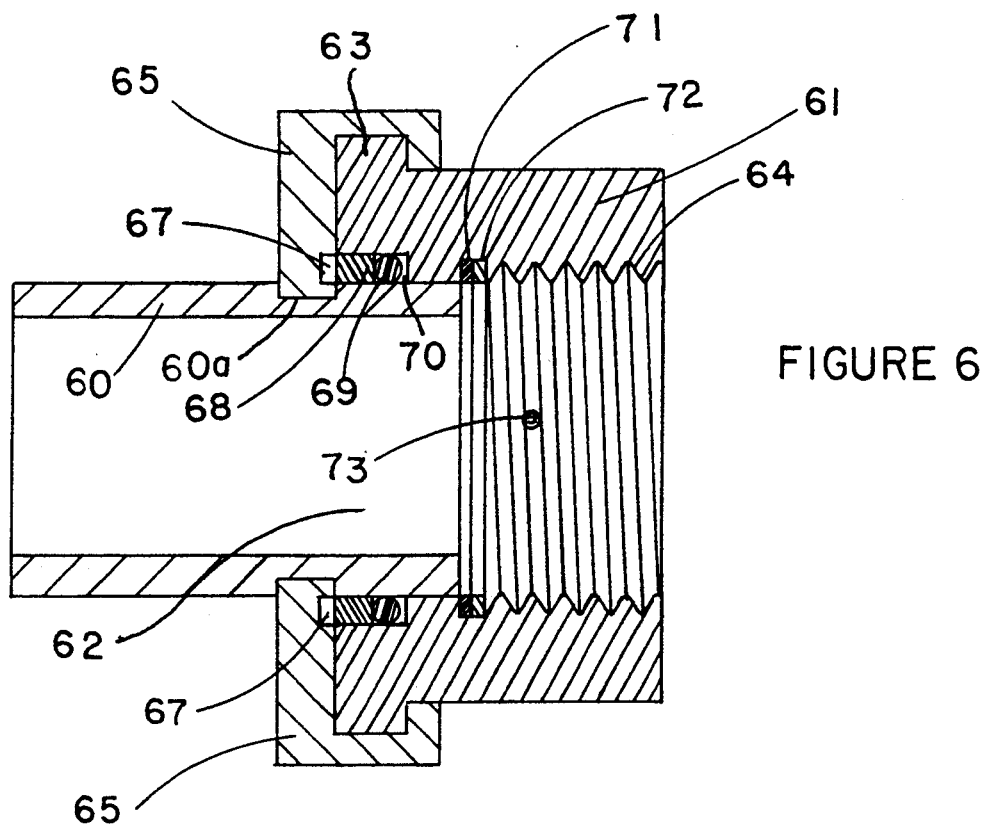

Alternately, a pressure activated locking system could be used. Such a system is shown in FIG. 6 which shows a coupling of the invention which couples the end of pipe 60 having a groove 60a to a pipe or other fitting, not shown, having a threaded end. As shown, the coupling of FIG. 6 has a coupling body 61 with an opening 62 for receiving the end portion of pipe 60 therein at one end, with an end collar 63 around that end, and a threaded, pipe receiving opening 64 at the other end. A set of U-shaped jaw members 65, similar to the jaw members 24, 25, 26, and 27 of FIGS. 1-4, are positioned over the end collar 63 with bolts, not shown, extending through respective jaw members 65 into receiving slots, not shown, in the coupling body similarly to that described for the embodiment of FIGS. 1-4. In this case, however, each of the jaw members 65 have an internal groove 67 which can receive an end of ring 68 therein. Ring 68 and O-ring seal 69 are received in circumferential groove 70 of coupling body 61.

In use, coupling body 61 is screwed onto the end of a pipe or fitting having male threads thereon. The pipe or fitting is sealed by seal 71 and ring 72. The pipe may be locked in place by a set screw inserted through hole 73. A pipe 60, with a standard end portion groove 60a, is inserted into opening 62 of the coupling body 61 and jaw members 65 are moved to closed position as described for the embodiment of FIGS. 1-4. O-ring 69 seals around pipe 60. When a pressurized fluid flows through the pipes or fittings joined by the coupling, the pressure of the fluid acting on seal 69 slides ring 68 outwardly into groove 67 in jaw members 65. This locks the jaw members in closed position. Openings through the jaw members, such as openings 46 shown in FIG. 4 may be provided through jaw members 65 for the insertion of a rod or other tool to push ring 68 out of groove 67 when it is desired to open jaw members 65.

While FIG. 6 shows a coupling between a pipe with end portion groove and a pipe with screw threads, the coupling could be constructed to couple a pipe with end portion groove to any other type of pipe or fitting, such as one with flanges rather than screw threads.

Figure 5:
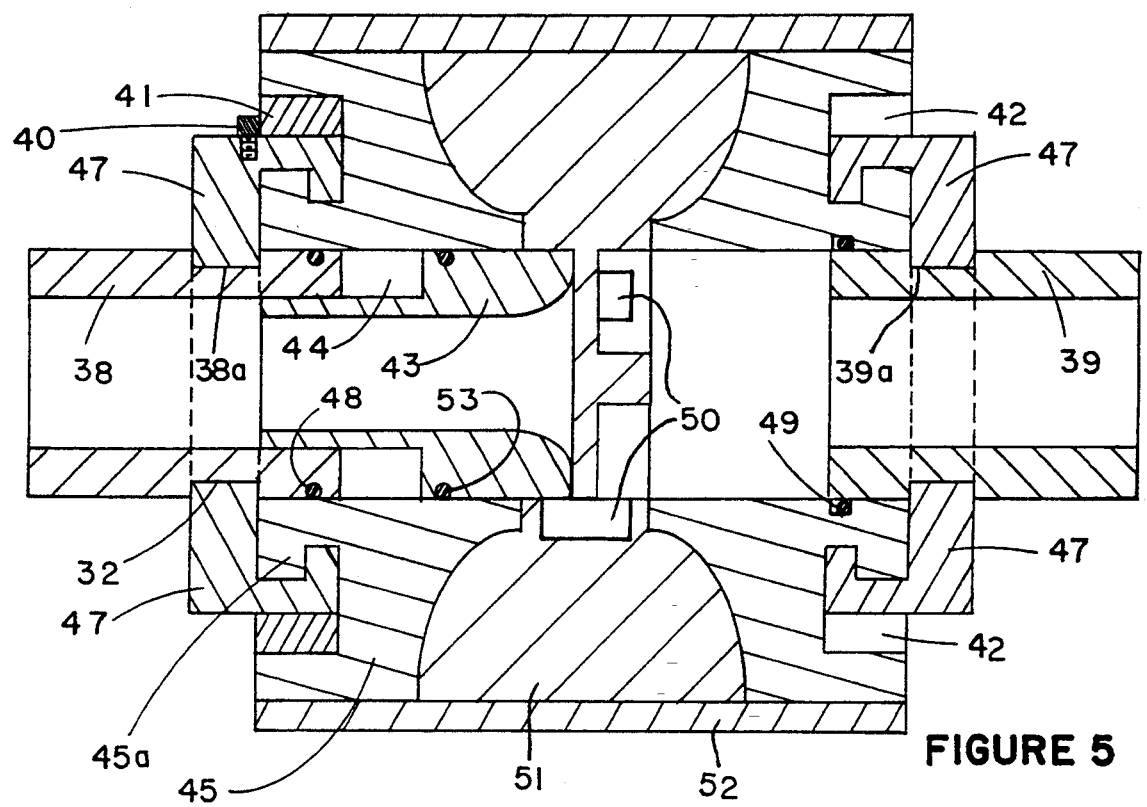

FIG. 5 shows the coupling of the invention built into a valve. The coupling body 45 also provides the valve body. Jaw members 47, similar to jaw members 24, 25, 26, and 27, fit into recess 42 around end collar 45a of coupling body 45. Slots similar to slots 13, FIG. 2, may be provided in the ends of the body and bolts, not shown, extend through jaw members 47 into the slots as described. The jaw members 47 operate as previously described. The end portions of pipes 38 and 39 are inserted into body 45 and the jaw members 47 moved to closed position to engage grooves 38a and 39a. O-rings 48 and 49 seal between the pipe ends and the valve body. To lock the jaw members in closed position, a ring 41 can be inserted in recess 42 and bolt 40 threaded into one of the jaw members 47 to hold it in place.

The valve could be of any type with a hydraulic valve similar to that shown in my U.S. Pat. Nos. 5,060,691 and 5,069,248 being shown somewhat schematically.

A series of flow passages 50 extend through a partition means 51. A cover 52 extends around the outside of the valve. A gate 43 is positioned in one side of the valve to slide along the inside of the valve body and inside of pipe 38. An O-ring 53 seals the gate where it contacts the inside of the valve body. Pressurized fluid in space 44 between the gate 43 and end of pipe 38 will cause the gate to move to closed position as shown in FIG. 5 wherein the gate 43 covers flow passages 50 to thereby close the valve. The position of gate 43 between the closed position shown, and an open position wherein the gate slides to the left toward pipe 38 in FIG. 5 is controlled by controlling the pressure of the fluid in space 44, as described in the referenced Patents.

While a valve is shown in FIG. 5 between the ends of pipes 38 and 39, various other types of fittings could be provided. Thus, the coupling body could be configured to provide a tee-coupling, Y-coupling, reducer, or various other standard pipe fittings.

Further, while the shoulder has been illustrated as formed by a groove in the end portion of the pipes and the jaws shown as engaging the groove, the shoulder could be formed by a flange on the end of the pipe or by a raised bead around the end portion of the pipe. The shoulder does not have to be continuous, although a continuous shoulder is currently preferred to provide maximum strength.

It has been found that the coupling of the invention can be made much smaller in outside diameter and lighter than traditional flange couplings for the same size pipe, and is easier to use than the traditional flange or screw-type couplings or other couplings such as the two piece clamp-type couplings used with pipes having grooved ends.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A coupling for attachment to the end portion of a pipe wherein the end portion of the pipe has a circumferential shoulder spaced from and facing away from the end of the pipe, comprising;

a coupling body to closely receive an end portion of a pipe therein and to extend over the end portion of the pipe at least to the edge of a circumferential shoulder provided in the end portion of the pipe;

a set of jaw members;

means movably mounting the jaw members on the coupling body for movement toward the pipe received in the coupling body with simultaneous circumferential movement partially around the pipe in one direction and movement away from the pipe received in the coupling body with simultaneous circumferential movement partially around the pipe in the opposite direction, whereby when the jaw members of the set move toward the pipe to a closed position they engage the shoulder to secure the coupling body to the pipe and when the jaw members of the set move away from the pipe to an open position they disengage the shoulder so the pipe can be removed from the coupling body; and means for moving the jaw members of the set with respect to the coupling body.

2. A coupling for attachment to the end portion of a pipe according to claim 1, the end portion of the pipe including a circumferential groove, the circumferential groove having side walls, the side wall of the circumferential groove closest the end of the pipe forming the circumferential shoulder, and wherein when the end portion of the pipe is received in the coupling body and the jaw members of the set move toward the pipe to closed position, they engage the groove of the pipe received in the coupling body.

3. A coupling for attachment to the end portion of a pipe according to claim 2, wherein the coupling joins two pipes in end to end relationship, each pipe having an end portion and a groove in the end portion forming the shoulder in the end portion of the pipe, wherein the coupling body is adapted to closely receive the end portion of each of two pipes to be joined in end-to-end relationship, the set of jaw members being located with respect to the coupling body to engage the groove in the end portion of one of two pipes to be joined, the coupling further including a second set of jaw members mounted on the coupling body with the jaw members of the second set being mounted for movement toward or away from a pipe received in the coupling body, the second set of jaw members being spaced from the set of jaw members and located with respect to the coupling body to engage the groove in the end portion of the other of two pipes to be joined when such other pipe is received in the coupling body and the jaw members of the second set are moved to a closed position around such pipe, and to disengage the groove of such other of the two pipes when the jaw members of the second set of jaw members move to an open position.

4. A coupling for attachment to the end portion of a pipe according to claim 3, wherein the coupling body is substantially cylindrical and of a length to extend between the circumferential shoulder of one pipe of two pipes to be joined end-to-end and the shoulder of the other of the two pipes to be joined, wherein the set of jaw members is located at one end of the body and the second set of jaw members is located at the other end of the body.

5. A coupling for attachment to the end portion of a pipe according to claim 4, wherein the coupling body includes sealing means for sealing around the ends of the pipes to be joined to prevent leakage therefrom.

6. A coupling for attachment to the end portion of a pipe according to claim 5, wherein the sealing means is at least one gasket.

7. A coupling for attachment to the end portion of a pipe according to claim 6, wherein the sealing means also includes means in conjunction therewith for locking the set of jaw members and the second set of jaw members in closed position when pressurized fluid is present in the pipes.

8. A coupling for attachment to the end portion of a pipe according to claim 4, wherein the means for moving the jaw members includes camming surfaces on the coupling body and mating camming surfaces on the jaw members so that as the jaw members are moved, the camming surfaces cause the jaw members to move toward or away from a pipe received in the coupling.

9. A coupling for attachment to the end portion of a pipe according to claim 8, wherein means are provided for manually moving the jaw members with respect to the coupling body.

10. A coupling for attachment to the end portion of a pipe according to claim 9, wherein the coupling body has slots in the ends thereof, said slots having ends and being positioned so that one end of each slot is closer to a pipe received in the coupling body than the other end, said slots forming the camming surfaces on the coupling body, the jaw members being positioned to cover the slots, and wherein pin means extend from the jaw members into the slots, the pin means forming the camming surfaces on the jaw members.

11. A coupling for attachment to the end portion of a pipe according to claim 10, wherein the pin means are bolts extending through the jaw members.

12. A coupling for attachment to the end portion of a pipe according to claim 10, wherein the end which is radially closer to a pipe received in the coupling body of at least one slot is deeper in the axial direction than the rest of the slot and the pin means which fits into that slot can be extended into the deeper end of the slot to lock the jaw members in closed position.

13. A coupling for attachment to the end portion of a pipe according to claim 10, wherein each jaw member is substantially U-shaped, wherein the coupling body includes an end collar, and wherein each jaw member is positioned over the end collar to secure the jaw member to the coupling body.

14. A coupling for attachment to the end portion of a pipe according to claim 1, wherein the means for moving the jaw members includes camming surfaces on the coupling body and mating camming surfaces on the jaw members so that as the jaw members are moved, the camming surfaces cause the jaw members to move toward or away from a pipe received in the coupling.

15. A coupling for attachment to the end portion of a pipe according to claim 14, wherein means are provided for manually moving the jaw members with respect to the coupling body.

16. A coupling for attachment to the end portion of a pipe according to claim 15, wherein the coupling body has slots in an end thereof, said slots having ends and being positioned so that one end of each slot is closer to a pipe received in the coupling body than the other end, said slots forming the camming surfaces on the coupling body, the jaw members being positioned to cover the slots, and wherein pin means extend from the jaw members into the slots, the pin means forming the camming surfaces on the jaw members.

17. A coupling for attachment to the end portion of a pipe according to claim 16, wherein the pin means are bolts extending through the jaw members.

18. A coupling for attachment to the end portion of a pipe according to claim 16, wherein the end which is radially closer to a pipe received in the coupling body of at least one slot is deeper in the axial direction than the rest of the slot and the pin means which fits into that slot can be extended into the deeper end of the slot to lock the jaw members in closed position.

19. A coupling for attachment to the end portion of a pipe according to claim 18, wherein each jaw member is substantially U-shaped, wherein the coupling body includes an end collar, and wherein each jaw member is positioned over the end collar to secure the jaw member to the coupling body.

20. A coupling for joining pipe wherein the end portions of the pipes to be coupled each have a circumferential groove therein adjacent the ends to be joined comprising:
 a cylindrical coupling body sized to closely fit over the ends of the pipes to be joined and extending between the respective grooves in the pipe;
 a plurality of jaw members;
 means movably mounting the jaw members on each end of the coupling body for movement radially inwardly with simultaneous circumferential movement partially around the pipe in one direction to engage a groove in a pipe entering the coupling body or for movement radially outwardly with simultaneous circumferential movement partially around the pipe in the opposite direction to release a pipe entering the coupling body; and means for moving the jaws with respect to the coupling body as desired.

21. A coupling for attachment to the end portion of a pipe according to claim 3, wherein the set of jaw members and the second set of jaw members are connected together so that both sets of jaw members are moved simultaneously between open and closed positions.

22. A coupling for attachment to the end portion of a pipe according to claim 1, wherein the coupling body includes valve means therein.

23. A valve to be connected to the end portion of a pipe wherein the end portion of the pipe has a circumferential shoulder spaced from and facing away from the end of the pipe, comprising:

a valve body having a receiving opening to closely receive an end portion of a pipe therein and to extend over the end portion of the pipe at least to the edge of a circumferential shoulder provided in the end portion of the pipe;

a set of jaw members;

means movably mounting the jaw members of the set on the valve body for movement toward the pipe received in the receiving opening with simultaneous circumferential movement partially around the pipe in one direction and movement away from the pipe received in the receiving opening with simultaneous circumferential movement partially around the pipe in the opposite direction, whereby when the jaw members of the set move toward the pipe to a closed position they engage the shoulder to secure the valve body to the pipe and when the jaw members of the set move away from the pipe to an open position they disengage the shoulder so the pipe can be removed from the valve body; and means for moving the jaw members of the set with respect to the valve body.

* * * * *